United States Patent [19]

Phillips et al.

[11] Patent Number: 4,702,963
[45] Date of Patent: Oct. 27, 1987

[54] FLEXIBLE POLYMER FILM WITH VAPOR IMPERMEABLE COATING

[75] Inventors: Roger W. Phillips; Craig M. Shevlin, both of Santa Rosa; John S. Matteucci, Healdsburg, all of Calif.

[73] Assignee: Optical Coating Laboratory, Inc., Santa Rosa, Calif.

[21] Appl. No.: 367,382

[22] Filed: Apr. 12, 1982

Related U.S. Application Data

[63] Continuation-in-part of Ser. No. 250,731, Apr. 3, 1981, abandoned.

[51] Int. Cl.⁴ ............................................. B32B 17/06
[52] U.S. Cl. .................................. 428/426; 428/432; 428/433; 428/480; 428/35; 428/469; 428/448; 428/689; 426/107; 426/126; 426/234
[58] Field of Search ............... 426/107, 126, 234, 412, 426/415; 428/432, 433, 458, 480, 35, 469, 448, 451, 450, 472, 689, 696, 701, 702

[56] References Cited

U.S. PATENT DOCUMENTS 4,215,168 7/1980 Yonemura ........................... 428/469
4,312,915 1/1982 Fan ...................................... 428/469

FOREIGN PATENT DOCUMENTS 140036 1/1982 Japan .................................. 428/432
59749 4/1982 Japan .................................. 428/432

OTHER PUBLICATIONS

"New High Barrier Film Which Permit Microwave Heating", *Journal of Microwave Power*, vol. 11, No. 2, (1976), pp. 211-212, Hecht et al.

*Primary Examiner*—Edith Buffalow
*Attorney, Agent, or Firm*—Flehr, Hohbach, Test Albritton & Herbert

[57] ABSTRACT

Flexible polymer packaging films having thin films of inorganic coatings deposited thereon to reduce the vapor permeability of the article. Inorganic thin film coatings comprising a composite of two materials are disclosed to confer both substantial transparency and retortability on the overall packaging film structure. The two material film composite involves either sequentially deposited films with the first thin film layer serving as an adhesion layer and the second thin film layer serving as a barrier layer. Alternatively, the two materials may be co-deposited to form a single thin film layer which provides sufficient adhesion to confer retortability on the overall film structure and also functions as relatively impermeable gas and vapor barrier for reducing the vapor transmission rate through the product. Various coated single film articles and dual film laminated articles are disclosed.

15 Claims, 6 Drawing Figures

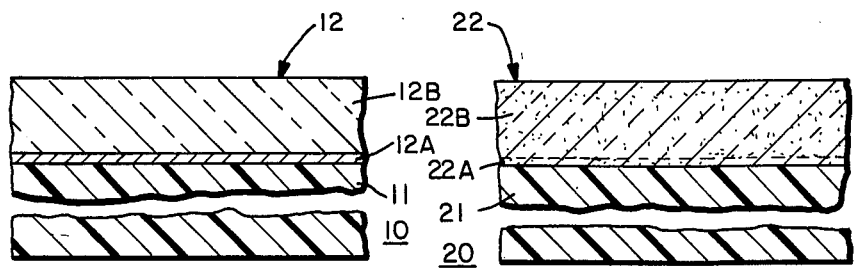
FIG.—1   FIG.—2
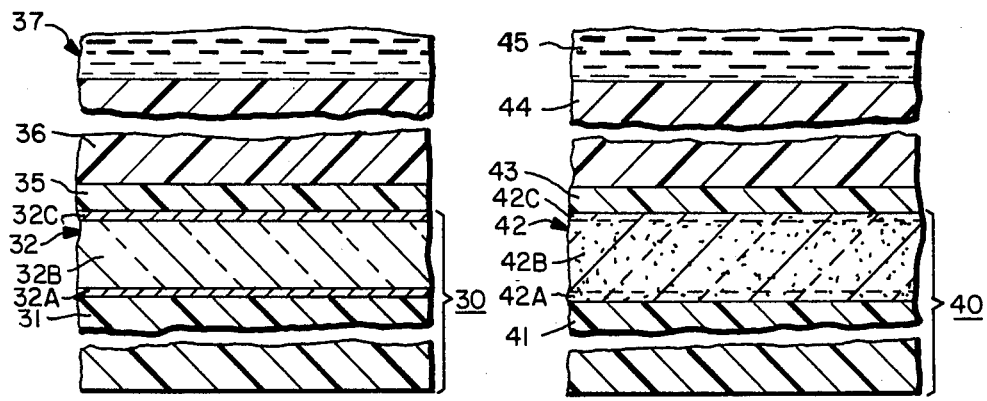
FIG.—3   FIG.—4
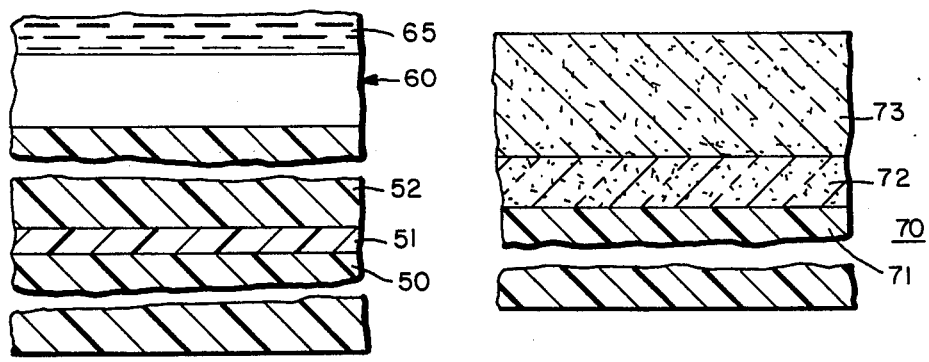
FIG.—5   FIG.—6

FLEXIBLE POLYMER FILM WITH VAPOR IMPERMEABLE COATING

This application is a Continuation-in-Part of our co-pending patent application, Ser. No. 250,731, filed Apr. 3, 1981, abandoned. This invention relates generally to flexible polymer packaging films and, more specifically, to flexible polymer packaging films which are coated to reduce the vapor permeability of the film.

Flexible polymer films are being used to an increasing extent in the packaging of food and medical products. If such packages are used to store products at room conditions, and if the product is harmed by the absorption of oxygen and water or by the loss of vaporized liquid from the product, then the laminate must contain a barrier to the transmission of these substances. A vapor impermeable barrier can be provided by including a metallic foil such as aluminum foil in a laminated film structure. However, for a number of products, the use of opaque aluminum foil is undesirable. In the food packaging industry, the use of aluminum foil precludes microwave heating of the contents of the package either to sterilize the food or to reheat it quickly in the package. In the medical products industry, the use of opaque aluminum foil in the laminate is often undesirable because it precludes viewing of the stored product to check its quality.

For several reasons there is a strong thrust within the hospital products field to package intravenous (IV) solutions in sealed bags of flexible polymer film rather than in glass bottles. Flexible polymer bags are lower in weight, and offer handling and storage convenience over breakable glass bottles.

Flexible polymer intravenous (IV) solution bags are currently manufactured from a polyvinyl chloride material which is capable of being sterilized under retorting conditions (a superheated water or steam sterilization operation) and which are substantially transparent to light in the visible portion of the spectrum. Transparency of the bag is important to permit inspection of the IV solution to ascertain whether any deterioration has occurred. However, the current IV bag material has a relatively high rate of water vapor transmission through the material. This requires that the IV bag be placed inside a second bag which has a substantially lower water vapor transmission rate. The second bag is typically comprised either of a rubber modified high density polyethylene material or a polymer-aluminum foil laminate. The requirement to utilize both an inner and outer bag is undesirable from several standpoints. Once the integrity of the outer bag is breached, the inner IV solution containing bag must be utilized to avoid loss of solution content and/or effectiveness. From a product labeling standpoint, the requirement to label both bags with the contents of the IV solution adds further additional cost and inventory complexity to the manufacturer and distribution of the product. Furthermore, there is increasing Food and Drug Administration concern over packaging materials which may contain unreacted vinyl chloride monomer.

While flexible polymer films such as polytrifluorochlorethylene film made by Allied Chemical Company and sold under the trademark ACLAR have sufficiently low water vapor permeability to be utilized in food and drug packaging applications, such films are quite expensive and are not used for large scale food or drug packaging purposes.

An article by J. L. Hecht et al. "New High-Barrier Films Which Permit Microwave Heating", *Journal of Microwave Power*, Vol. 11, No. 2 (1976), pp. 211-212 refers to a packaging film consisting of a thin coating of a metallic phosphate sandwiched between a polyester film and a heat-sealable polymer layer to create an article which has gas and vapor permeability comparable to that of a foil-polymer laminate structure. The Hecht et al. packaging film performed well under limited sterilization conditions utilizing microwave heating. However, as noted by Hecht et al.: "The principal limitation of the inorganic-coated films made to date is that, if subjected to retorting conditions, the barrier coating is lost." Even with microwave heating type of sterilization, Hecht et al. note that the film must not be exposed to high temperature water or water vapor for too long a period of time. Accordingly, it is apparent that there is a need for a flexible packaging film product which has all of the properties of substantial transparency in the visible portion of the electromagnetic radiation spectrum, the capability of withstanding a superheated water or steam sterilization operation (retorting) and substantially lower gas and vapor permeability compared to uncoated polymer substrate.

It is an object of this invention to provide an improved packaging film.

It is a further object of this invention to provide an improved thin film coated flexible polymer film having the properties of substantial transparency, retortability, and substantially lowered gas and vapor permeability.

It is a further object of this invention to provide an improved packaging film comprising a flexible polymer substrate with a thin film inorganic coating carried thereon and being characterized by the properties of substantial transparency, retortability, low gas and vapor permeability and being capable of being adhesively laminated to a second polymer material and heat-sealed into a final packaging configuration.

In accordance with the one aspect of this invention the above-stated objects are achieved in an article comprising a flexible polymer substrate and a thin film coating carried on at least one surface of the substrate and characterized by the properties of substantial transparency in the visible portion of the electromagnetic radiation spectrum, the capability of withstanding a superheated water or steam sterilization operation (i.e. retortability) and substantially lower gas and vapor permeability compared to an uncoated polymer substrate. The thin film coating comprises a composite of at least two separate materials preselected from a group of materials which have been predetermined to produce said properties.

In one embodiment of the invention the composite thin film coating comprises a thin film adhesion layer formed directly on the substrate of a first material selected from a first group of materials which have been predetermined to have sufficient adhesion properties to confer on the article the retortability property and a thin film barrier layer formed on the adhesion layer of at least one material selected from a second group of materials which have been predetermined to confer on the article the property of substantially lowered gas and vapor permeability. In another embodiment the composite thin film coating includes at least one cermet layer comprising a co-deposited mixture of chromium and silicon monoxide having at least about twenty percent by weight of chromium. In the first mentioned embodiment the first group of materials utilized for the adhesion layer comprises at least chromium, tantalum, nickel, molybdenum, oxides of chromium, alloys of chromium with tantalum and nickel, a co-deposited mixture of chromium and silicon monoxide having at least about twenty percent chromium by weight and a lead-aluminum silica glass composition available from Innotech Corporation of 2285 Reservoir Avenue, Trumbull, Conn. under the trade identification IP-820. In this embodiment the second group of materials comprises at least silicon monoxide, silicon dioxide and mixtures of silicon dioxide with glass modifiers such oxides of magnesium, barium and calcium or with fluorides of alkalai earth metals such as magnesium fluoride.

Another aspect of this invention features an article comprising a flexible polymer substrate and a thin film coating carried on at least one surface of the substrate and characterized by the properties of substantial transparency, substantially lower gas and vapor permeability compared to uncoated polymer substrate, the capability of being bonded to a second flexible polymer sheet on the thin film coating side of the substrate utilizing an adhesive and retortability after the bonding operation has been performed. This article features a thin film coating which also comprises a composite of at least two separate materials formed on the substrate with the materials being preselected from a group of materials which have been predetermined to produce these properties.

One embodiment of this type of article involves a composite thin film coating which comprises a thin film adhesion layer formed directly on the substrate of a first material selected from the first group of materials which have been predetermined to have sufficient adhesion properties to confer retortability on said article, a thin film barrier layer formed on the adhesion layer of at least a second material selected from a second group of materials which have been predetermined to confer on the article the property of substantially lower gas and vapor permeability, and a thin film adhesion layer formed on the barrier layer of a material selected from the first group of materials and enabling the thin film layer to be bonded to a second flexible polymer sheet using an appropriate adhesive.

Another embodiment of this type of article involves using a composite thin film coating which includes at least one cermet layer comprising a co-deposited mixture of chromium and silicon monoxide having at least about twenty percent by weight of chromium wherein the cermet layer confers all of the stated properties on the article.

Instead of utilizing a single cermet layer in the composite thin film coating, a pair of cermet layers comprising a first very thin cermet layer having a higher percent weight ratio of chromium may be employed as an adhesion layer, followed by a second cermet layer having a lower chromium content to provide the barrier layer and to insure a high degree of light transmission through the film.

Another aspect of this invention features an article comprising a flexible polymer substrate and a thin film coating carried on at least one surface of the substrate and characterized by the properties of substantial visible light transparency, retortability, and substantially lower gas and vapor permeability compared to uncoated polymer substrate and wherein the thin film coating is formed by a process of depositing on the substrate surface at least two preselected materials either in prearranged sequential deposition steps to form a thin film adhesion layer and a thin film barrier layer or by simultaneous deposition of both of the materials at prearranged rates to form a single composite thin film layer having both adhesion and barrier layer characteristics. The materials of these thin films formed in accordance with this process are generally the same materials as previously described.

Another aspect of this invention features a similar article which also has the capability of being bonded to a second flexible polymer sheet on the side of the thin film coating utilizing a pressure sensitive adhesive layer. In this product the thin film coating is formed by a process of depositing on the substrate at least two preselected materials either in prearranged sequential deposition steps to form a thin film adhesion layer on the substrate, a thin film barrier layer on the adhesion layer and a second adhesion layer on the barrier layer. Alternatively, simultaneous deposition of both of the materials at a prearranged rate is performed to form a single composite thin film layer having adhesion layer and barrier layer characteristics.

A preferred embodiment of this invention features an article comprising a flexible polymer substrate and a thin film coating carried on at least one surface of the substrate and comprising a thin film layer of chromium formed on the substrate surface and a thin film layer of a preselected glass material formed on the layer of chromium. The thin film layer of chromium is preferably formed to a thickness which provides substantial transparency to visible light, for example a chromium layer thickness between about five and fifty Angstroms. Preferably the layer of glass material is selected from a group of materials consisting of silicon monoxide, silicon dioxide and mixtures of silicon dioxide with glass modifiers such as magnesium oxide, barium oxide and calcium oxide. Preferably the layer of glass material is formed to a thickness which provides substantially reduced gas and vapor permeability for the article as compared to uncoated substrate material. For example, the layer of glass material may be formed to a thickness in the range between about 500 Angstroms and about 4000 Angstroms.

A packaging material article formed in accordance with this invention may be utilized in a laminate structure of two polymer films with one of the polymer films being a heat-sealable film such that the laminate may be formed into a product enclosing pouch or package using standard heat sealing techniques. Utilization of the packaging film article of this invention provides a substantially transparent, retortable, high vapor impermeability packaging film which can be utilized in the food and medical products industry. Products such as IV solutions may be packaged in a laminate structure with sufficient transparency to visible light to enable the quality of the IV solution to be visually checked and with sufficiently low water vapor permeability to permit long term storage of the single bag laminated enclosure. The achievement of a retortable packaging film utilizing inorganic coatings on a flexible polymer substrate represents a substantial packaging film improvement which may find utilization in numerous areas. For the medical products industry it offers the advantage of providing an IV packaging approach in which only a single bag is required, eliminating all of the problems and disadvantages inherent in the two bag approach previously described, but retaining all of the advantages of the flexible bag enclosure.

Other objects, features, and advantages of this invention will be apparent from a consideration of the following detailed description taken in conjunction with the accompanying drawings.

FIG. 1 is a fragmented section view of an article in accordance with this invention including a flexible polymer film and a thin film coating.

FIG. 2 is a fragmented section view of another embodiment of an article in accordance with this invention comprising a flexible polymer film with a thin film coating thereon.

FIG. 3 is a fragmented section view of another embodiment of an article in accordance with this invention assembled into an overall laminated polymer film structure.

FIG. 4 is a fragmented section view of another alternate embodiment of this invention assembled into an overall laminated packaging film structure.

FIG. 5 is a fragmented section view of another laminated polymer film structure utilizing this invention.

FIG. 6 is a fragmented section view of another alternative embodiment of an article in accordance with this invention comprising a flexible polymer film and a thin film coating thereon.

This invention is based on the surprising discovery that very thin layers of certain metals, metal oxides, and metal alloys, either as single integral layers or in intimate mixtures formed by co-deposition with other coating materials provide an excellent adhesion layer for adhering inorganic films to flexible polymer substrates. This discovery thus permits the formation of highly adherent thin film coatings on flexible polymer substrates which are capable of withstanding superheated water or steam sterilization procedures (a property hereinafter sometimes referred to as "retortability"). These adhesion layers, generally consisting of materials with a relatively high light absorption characteristic may be formed in a sufficiently thin layer to retain substantial transparency of the overall coating, and the overall coated polymer film article, in the visible range of the electromagnetic spectrum. Consequently, this discovery permits the formation of a coated polymer film which has all of the properties of substantial transparency of visible light, the capability of withstanding a superheated water or steam sterilization operation and substantially lower gas and vapor permeability compared to uncoated polymer substrate. The lower permeability is contributed mainly by the inorganic glass coating deposited on the thin adhesion layer.

Another aspect of the discovery of this invention is that certain co-deposited mixtures of metals and metal oxides perform the dual function of serving as an adhesion layer for purposes of conferring retortability on the article and a barrier layer for conferring the property of substantially lower gas and vapor permeability. In this connection, it may be understood that the initial thin layer of the co-deposited film mixture serves as the adhesion layer and the additional thicker portion of the deposited thin film coating serves as the barrier layer.

A subsidiary discovery which forms the basis for certain embodiments of this invention is that the same materials which permit a glass barrier layer to strongly adhere to a flexible polymer substrate may also be applied on top of the glass barrier layer to serve as an adhesion layer for a thin polymer-based adhesive used to bond the coated polymer substrate to a second flexible polymer film to form an overall laminated packaging structure. In embodiments in which the thin film coating is a co-deposited mixture of metal and metal oxide material, the first few Angstroms of deposited material serve as the adhesion layer on the first flexible polymer substrate on which the coating is deposited and the last few Angstroms of the deposited coating serve as the second adhesion layer for purposes of conferring the property of being able to bond the coated substrate to a second polymer film using an adhesive.

Referring now to the drawings, FIG. 1 illustrates in a fragmented cross-section one embodiment of an article 10 in accordance with this invention which comprises a flexible polymer substrate 11 and a thin film coating 12 carried on one surface of substrate 11. As shown, the thin film 12 is a composite of two separate materials, sequentially deposited on substrate 11. A first layer 12A of the thin film coating 12 is an adhesion layer which may be formed from one of a first group of materials and the second layer 12B is a barrier layer which may be formed from a second group of materials.

The first group of materials which have been thus far discovered to provide sufficient adhesion to the polymer substrate 11 include chromium, tantalum, nickel, molybdenum, oxides of chromium, alloys of chromium with tantalum and nickel, co-deposited mixtures of chromium and silicon monoxide having at least about twenty percent chromium by weight and a lead-alumina-silica glass composition which is available from Innotech Corporation of 2285 Reservoir Avenue, Trumbull, Conn. under the identification IP-820. This select group of materials has been identified in preliminary research from a large group of materials which have been tried and represents an initial first group of materials which confer the property of sufficient adhesion of the thin film coating to confer retortability on the overall article 10. Generally the materials in this first group are relatively highly absorbent in the visible region of the spectrum but the adhesion layer 12A may be made sufficiently thin to retain substantial transparency (i.e. at least about five percent).

It appears that these adhesion layer materials confer retortability to coatings formed on a number of types of polymer substrates, including polyester substrates (e.g. polyethylene terephthalate) and other types of polymers such as polyolefins (e.g. polypropylene and polyethylene).

While all of the above-recited materials in the first group confer retortability on the overall coated article, the currently preferred material is a thin layer of chromium. The chromium is preferred because it appears to produce the best result as far as overall adhesion of the thin film coating and the greatest degree of retortability to the overall product. The use of a thin chromium layer as the adhesion layer 12A provides a substantial safety margin to maintain coating integrity during sterilization and produces the highest yield of satisfactory product.

The thickness of the adhesion layer 12A is not critical and may be formed in the range between about 5 Angstroms and about 50 Angstroms. The lower value of 5 Angstroms should be understood to be an approximation since it is difficult to monitor actual film thicknesses in this regime. Generally the lower thickness range values are preferred since the materials which are capable of serving as adhesion layers are highly absorbent for visible light. Generally layer thicknesses of about 10–20 Angstroms appear to be optimum at this time from the standpoint of deposition parameters (speed, temperature, etc.) achievable in roll coating equipment which would be utilized to manufacture coated articles of this type. The barrier layer 12B may generally be selected from a fairly wide variety of glass-like materials, all of which confer some reduction in gas and vapor permeability to the overall article. However, silicon monoxide and silicon dioxide are preferred materials due to their high transparency, ease of deposition, and substantial barrier properties. Where silicon dioxide is utilized as the glass barrier layer 12B, it may be mixed with various glass modifiers such as oxides of magnesium, barium and calcium, or with fluorides of alkalai earth metals, e.g., magnesium fluoride. Utilizing glass modifier materials the color appearance of the overall coating can be altered. For example, a chromium-silicon monoxide composite thin film structure produces a coating with a yellowish appearance. A coating with a neutral gray appearance may be achieved by mixing silicon dioxide and glass modifiers to serve as the barrier layer 12B.

The thickness of the barrier layer 12B generally determines the degree of reduction in gas and vapor permeability of the overall article compared to uncoated polymer substrate. Accordingly, the degree of reduction in permeation rates may be tailored to the particular requirement for the packaging film. The upper limit on the thickness of the barrier layer 12B is generally determined by the thickness at which stress cracking of the deposited film begins to occur. Using current deposition technology, the barrier layer may be deposited generally to a thickness of up to about 4000 Angstroms without stress cracking of the coating. At this time it is believed that the useful range of barrier layer coating thicknesses is about 500 Angstroms to 4000 Angstroms.

Referring now to FIG. 2, another embodiment of this invention in the form of an article 20 comprising a flexible polymer substrate 21 and a thin film coating 22 thereon is depicted. In this case the thin film coating 22 also comprises a composite of two materials, but the two separate materials are co-deposited chrome and silicon monoxide to form a thin film cermet layer. The method of depositing cermet layers by simultaneous deposition of metal and glass materials is known in the art, but applicant's discovery here is that, provided the percent by weight of chromium in the initial 5 or 10 Angstrom layer 22A of the cermet coating 22 consists of at least about twenty percent chromium by weight, the property of retortability is conferred on the overall coating 22. In other words, the adhesion of the cermet layer 22 to the polymer substrate 21 is sufficient to confer the retortability property if at least the initial cermet layer is sufficiently rich in chromium to achieve good adhesion properties. The remaining thickness region 22B of the cermet coating 22 serves as a barrier layer for reducing the gas and vapor permeability of the overall article 20 compared to that of the substrate 21 alone. As will later be seen, the use of a cermet film 22 to serve the dual function of an adhesion layer 22A and barrier layer 22B has certain advantages over the sequential layer structure of the thin film 12 in FIG. 1 in that a single pass through a single deposition chamber in a roll coating machine is all that is required to form the cermet layer 22. The sequential layer structure of the thin film coating 12 in FIG. 1 requires either a roll coating machine with two separate deposition chambers or it requires two passes through a single chamber roll coating apparatus.

FIG. 3 depicts a fragmented cross-section of a coated article 30 in accordance with this invention assembled into an overall dual polymer film laminate package structure which may be utilized to package various food or medical products. In this case the coated article 30 comprises a flexible polymer substrate 31 which is preferably formed of a polyester material such as 92 gauge DuPont LB polyester (PET). The thin film coating 32 comprises an adhesion layer 32A formed directly on the polymer substrate 31, a glass barrier layer 32B formed on the adhesion layer 32A, and a second adhesion layer 32C formed over the glass barrier layer 32B. The materials for the adhesion and barrier layers may be any of those materials set forth above, the presently preferred adhesion layer being chromium and the preferred barrier layer 32B being silicon monoxide or silicon dioxide with or without glass modifiers included therein. The thin film layer 32 may be formed in roll coating apparatus having three separate vacuum chambers, or alternatively it may be formed in a roll coating apparatus with one or two chambers by effecting multiple passes of the substrate through the deposition chamber or chambers.

After the coated article 30 has been produced, it is bonded to a second polymer film 36 utilizing an adhesive 35. The upper adhesion layer 32C provides for good bonding of the article 30 on the side of the coating 32 to the surface of polymer film 36 utilizing the adhesive layer 35. Depending upon the quality of the adhesive and the laminating process utilized it is sometimes possible to eliminate the adhesion layer 32C. For purposes of maintaining substantial flexibility of the overall laminate and to permit heat sealing of separate sheets thereof into an overall packaging enclosure, the second polymer film layer 36 is preferably a heat sealable polyolefin polymer such as polypropylene or polyethylene. For example a three to five mil thick polypropylene film sold under the designation Extrel 24 by Exxon Corporation may be utilized for the flexible polymer film 36. The adhesive layer 35 may be any suitable type of laminating adhesive capable of being applied in very thin transparent layers such as the 4910 adhesive available from 3M Company of St. Paul, Minn.

The laminated package assembly depicted in FIG. 3 may be fashioned into pouches or enclosures using conventional heat sealing techniques, and these pouches and enclosures may be utilized to contain a volume of liquid 37 or a product with a substantial moisture content. The composite laminate is capable of withstanding a superheated water or steam sterilization operation and thus can be utilized for packaging medical products or food products which require sterilization either for product safety or long shelf life.

FIG. 4 depicts the use of a cermet coated polymer substrate in a laminate structure similar to that depicted in FIG. 3. In this case the coated article 40 comprises a flexible polymer substrate 41 with a chromium-silicon monoxide cermet layer 42B deposited thereon. A second flexible polymer layer 44 is bonded to the cermet film 42 utilizing a thin layer of pressure sensitive adhesive 43. The materials of the two polymer layers 41 and 44 may be the same as those discussed in connection with FIG. 3 and the pressure sensitive adhesive may also be the same. In the laminate structure depicted in FIG. 4, the cermet layer 42 serves both as a barrier layer in the bulk region 42B and as adhesion layers in the five to ten Angstrom thick interface regions 42A and 42C adjacent the surfaces of the polymer film 41 and the adhesive layer 43, respectively.

Because the thin cermet film is bonded between two polymer layers and is not directly exposed to hot water or steam, as long as the chromium-silicon monoxide cermet layer 42 contains, within the interface regions 42A and 42C, at least about ten percent chromium by weight, the adhesion of the cermet layer to the substrate 41 and to the adhesive bonding layer 43 is sufficient to confer good retortability on the overall laminated product. The laminated structure shown in FIG. 4 may be formed into a pouch or enclosure utilizing standard heat sealing techniques. This pouch or enclosure may then be filled with a liquid such as an IV solution or a food product and then sealed. The container may then be subjected to a retorting operation to sterilize the container and its contents.

During the deposition of the cermet layer 42, small amounts of oxygen may be bled into the deposition chamber to increase the transparency of the overall cermet film. Some of the constituents of the cermet film will become chromium oxide when this oxygen bleed-in is performed, but the cermet layer will retain its adhesion properties if the oxygen pressure during deposition is not too high for the percent concentration of chromium in the original mixture.

FIG. 5 illustrates another version of a laminated film structure in which the two polymer layers 50 and 52 are adhesively bonded together with an adhesive layer 51 after the polymer film 52 has been coated with a thin film composite coating 60 in accordance with this invention. Composite coating 60 may comprise either the two layer thin film structure 12 depicted in FIG. 1 or the co-deposited cermet thin film 22 depicted in FIG. 2. The laminated structure depicted in FIG. 5 may be formed into an enclosure utilizing heat sealing techniques if the polymer film 52 is a heat sealable film. Standard heat sealing techniques may be utilized since the thin coating 60 will be effectively penetrated and broken in a localized fashion at the point where heat sealing gripping elements are applied to the overall laminated structure. The deposited thin film coating 60 will confer on the overall product depicted in FIG. 5 the same performance characteristics as the articles depicted in FIGS. 1 through 4.

The dual polymer film laminated structure as depicted in FIGS. 3 and 4 are presently preferred versions of a packaging film structure be utilized for a critical medical product such as intravenous solution. By encapsulating the thin film coatings between two polymer layers, the integrity of the thin film coating will not be compromised during product handling or transportation. If the thin film layers 32 or 42 shown in FIGS. 3 and 4 were positioned on the outside surface of the overall laminated structure, the coating would be subject to mechanical scratching and abrasion which could produce localized film defects which would undesirably affect the overall appearance and performance of the product. Furthermore, were the thin film coatings 32 or 42 formed on the inner polymer film portion of the structure and in contact with the material within the package, product contamination might occur. This would be undesirable for some products such as IV solutions and other medical products where purity and patient safety are paramount considerations. It should be understood, however, that although the dual polymer film laminated structures are presently preferred for some applications, there may be other packaging applications which could utilize in a straightforward manner a single polymer layer having the thin film coating shown in either FIG. 1 or FIG. 2 thereon. Furthermore, it should be understood that a single flexible polymer film with both surfaces coated with thin film coatings in accordance with this invention may be provided.

FIG. 6 depicts an alternative version of a cermet type of thin film coating in which the article 70 comprises a polymer substrate 71 with a first cermet layer 72 formed on one surface thereof and a second cermet layer 73 formed over the first cermet layer 72. The first cermet layer 72 may be formed with a higher chromium content then the cermet layer 73 in order to serve principally as an adhesion layer to ensure adhesion of the lower chromium content cermet layer 73 to the substrate 71. The lower chromium content cermet layer 73 may have sufficient chromium content to provide good adherence to an adhesive layer if the article 70 is to be bonded to another polymer film to form an overall laminated structure. By forming a thin, higher chromium content layer 72 as the adhesion layer and a lower chromium content cermet layer 73 as the barrier layer the overall light transmission through the article may be improved. For example, the cermet adhesion layer 72 may have a chromium content of thirty to fifty percent chromium by weight and the cermet layer 73 may have a chromium content of five to ten percent chromium by weight.

Table 1 below sets forth the typical water vapor transmission rates (WVTR) for some standard polymeric packaging films in use today. The WVTR values given throughout this specification are in gm/100 sq.in./day at a relative humidity of ninety to ninety-five percent and at a temperature of 40° C. (100° F.). All of the values given, with the exception of "Saranex 15", are for polymeric films with a one mil thickness, the thickness of the "Saranex" film being four mil.

TABLE 1

| POLYMER FILM TYPE | WVTR |
|---|---|
| BIAXIALLY ORIENTED POLYACRYLONITRILE FILM ("CLEAR-FOIL" FROM MOBIL CHEMICAL CO. MACEDON, NEW YORK) | 0.5 |
| SARAN - POLYETHYLENE COEXTRUDED MULTILAYER FILM ("SARANEX 15" FROM DOW CHEMICAL CO., MIDLAND, MI) | 0.15 |
| BIAXIALLY ORIENTED NYLON COATED WITH POLYVINYLIDENE CHLORIDE ("EMBLEM" FROM MARUBENI AMERICA) | 0.6–1.0 |
| BIAXIALLY ORIENTED POLYESTER ("PET") | 1.0–1.3 |
| POLYVINYL CHLORIDE | 2.1–5.0 |
| POLYPROPYLENE | 0.56 |
| POLYVINYLIDENE CHLORIDE ("SARAN" FROM DOW CHEMICAL CO.) | 0.097–0.45 |
| POLYCHLOROTRIFLUOROETHYLENE COPOLYMER (CTFE) ("ACLAR-33" FROM ALLIED CHEMICAL) | 0.025 |
| POLYETHYLENE (DENSITY = 0.96 gm/ml) | 0.26 |

The WVTR requirements for IV bags varies with the bag size and generally ranges between about 0.02 and 0.5 with the required WVTR values varying in direct relation with bag size. Comparing these WVTR requirement for IV bags with the typical WVTR values for polymeric packaging films given in Table 1, it is readily apparent that only the ACLAR-33 film is capable of satisfying the WVTR requirements for most IV bag sizes. Although ACLAR-33 has a low WVTR it has a relatively high oxygen transmission rate of 7.10 cubic centimeters per 100 inches per day and is thus unsuited to some applications requiring low transmission rates for oxygen or other gases. Currently, IV solution bags are formed from a polyvinyl chloride material and, as previously indicated, there is a strong interest in switching to another packaging material having a lower WVTR to eliminate the need for the outer bag and also to discontinue the use of packaging material possibly containing unreacted vinyl chloride monomer.

EXAMPLE 1

A thin film coating corresponding to the coating design depicted in FIG. 3 was formed on 92 gauge DuPont LB PET. The coating design involved an adhesion layer of ten Angstroms of chromium formed on the PET substrate, a layer of silicon monoxide 2000 Angstroms in thickness formed on the chromium adhesion layer and a second chromium layer of ten Angstrom thickness formed over the silicon monoxide barrier layer. The coated side of the PET substrate was bonded to a five mil thick polypropylene film (Extrel 24 from Exxon) at Rexham Corporation, 1201 Greenwood Cliff, Charlotte, N.C. with a proprietary Rexham adhesive. The laminated structure passed a retorting test at Rexham involving exposure of the laminate to superheated water at 250° F. for about one-half hour. The deposited coating remained firmly bonded to the PET substrate and to the adhesivepolypropylene film.

WVTR measurements were made on the laminated films at Rexham Corporation using both a gravimetric technique with the 92 gauge PET exposed to the high humidity and on a Mocon IRD-2C WVTR machine (available from Modern Controls, Inc., Elk River, MN) with the 92 gauge PET substrate exposed to the high humidity. The measured WVTR rates for several samples were in the range of 0.051 to 0.065. Tests run at Optical Coating Laboratories of Santa Rosa, Calif. on samples of this design utilizing a Mocon Permatran W WVTR machine with the five mil polypropylene film exposed to the high humidity resulted in measured values between 0.0501 and 0.0742 for the laminate. It has been demonstrated that the reduction in vapor permeability is bidirectional so the WVTR value is independent of the side exposed to high humidity. The measured WVTR values for the 92 gauge PET substrate alone was 1.57. The measured values for the five mil polypropylene alone were in the range of 0.146–0.176. The measured WVTR values for a laminated structure with an uncoated PET substrate bonded directly with an adhesive to five mil polypropylene were in the range of 0.130–0.153. It is thus seen that the addition of the chromium-silicon monoxide-chromium thin film layer to the PET substrate substantially reduced the water vapor transmission rate through the laminated structure.

EXAMPLE 2

92 gauge PET substrates from two different manufacturers were coated with a Cr—SiO—Cr thin film structure using thicknesses similar to those given in Example 1 above and then hand-laminated to five mil polypropylene utilizing a 3M 4910 pressure sensitive adhesive. WVTR values for these laminated structures, measured on a Mocon Permatron W machine, were in the range of 0.0272–0.0313. It is believed that these WVTR values represent an optimum range of values for the laminated structure and values close to these should ultimately be achievable in high volume laminating production facilities. Referring back to Table 2, it should be apparent that laminated structures of this design and having these WVTR values will satisfy the WVTR requirements for most IV bag sizes.

EXAMPLE 3

Laminated structures corresponding to those depicted in FIG. 3 utilizing a coating design consisting of adhesion layers of about ten Angstroms of chrome and a barrier layer of 2000 Angstroms of silicon dioxide were formed. The Cr—$SiO_2$—Cr coating was deposited on 92 gauge PET substrate and handlaminated, using 3M 4910 pressure sensitive adhesive, to five mil polypropylene. WVTR values for these samples measured on a Mocon Permatron W machine were in the range of 0.0421–0.0507. All of the samples passed a simulated retort test utilizing superheated water at 250° F. for one-half hour.

EXAMPLE 4

Laminated structures corresponding to the design illustrated in FIG. 3 were formed by depositing a thin film coating comprising ten Angstrom thick chromium adhesion layers and a 1000 Angstrom barrier layer consisting of silicon dioxide mixed with a calcium oxide glass modifier with a fifty weight percent of each constituent. The coated PET substrate was hand laminated to five mil polypropylene utilizing 3M 4910 pressure sensitive adhesive. Measured WVTR values were in the range of 0.0259–0.0342. All of the samples passed the retort test.

EXAMPLE 5

A laminated film structure corresponding to the design depicted in FIG. 3 was fashioned by coating a 92 gauge PET substrate with a thin film coating consisting of ten Angstrom chromium adhesion layers and a 1000 Angstrom composite silicon dioxide-magnesium oxide barrier layer using thirty-five weight percent MgO. The coated PET substrate was hand laminated to five mil polypropylene using 3M 4910 pressure sensitive adhesive. WTVR values as low as 0.0140 were measured for this laminated structure. All of the samples passed the retort test.

EXAMPLE 6

A laminated coated film design corresponding to that depicted in FIG. 3 was fashioned by depositing a thin film coating on 92 gauge PET substrate using a 20 Angstrom chromium adhesion layer and a barrier layer consisting of a 1000 Angstrom layer of a mixture of silicon dioxide and magnesium oxide having thirty-five weight percent MgO. The coated PET substrate was bonded to five mil polypropylene using 3M 4910 pressure sensitive adhesive. Measured WVTR values for this design were as low as 0.0133. The samples passed the simulated retort test described above.

EXAMPLE 7

Laminated coated film structures according to the design depicted in FIG. 3 were fashioned by depositing a thin film coating on 92 gauge PET substrate utilizing a ten Angstrom chromium adhesion layer and a barrier layer consisting of 1000 Angstroms of a mixture of silicon dioxide and barium oxide, using forty-six weight percent BaO. The coated PET substrate was hand laminated to five mil polypropylene using 3M 4910 pressure sensitive adhesive. Measured WVTR values for this structure were as low as 0.0234. The laminated coated film structure passed the simulated retort test previously described.

EXAMPLE 8

Laminated film structures corresponding to those depicted in FIG. 4 were fashioned by depositing on a 92 gauge PET substrate a 1000 Angstrom thick Cr-SiO cermet layer consisting of forty weight percent chromium. During the deposition, the oxygen pressure was maintained at $10^{-5}$ torr. The coated PET substrate was hand laminated to five mil polypropylene utilizing 3M 4910 pressure sensitive adhesive. WVTR values as low as 0.0660 were measured for these samples. The samples passed the simulated retort test previously described.

EXAMPLE 9

Laminated coated film structures corresponding to those depicted in FIG. 4 were fashioned by depositing a 2000 Angstrom Cr-SiO cermet layer (forty weight percent chromium) on 92 gauge PET and hand laminating the coated PET substrate to five mil polypropylene using 3M 4910 pressure sensitive adhesive. During the deposition, the oxygen pressure was maintained at $10^{-5}$ torr. Measured WVTR values for structures of this type were as low as 0.0351. The samples passed the simulated retort test described above.

EXAMPLE 10

Laminated film structures corresponding to those depicted in FIG. 4 were fashioned by depositing a 2000 Angstrom Cr-SiO cermet layer on 92 gauge PET substrate with ten weight percent chrome in the cermet and an oxygen pressure during deposition of $10^{-5}$ torr. The coated PET substrate was hand laminated to 1.5 mil polypropylene using 3M 4910 pressure sensitive adhesive. WVTR values as low as 0.0317 were measured for these samples and they passed the simulated retort test.

EXAMPLE 11

An laminated film structure corresponding to the cermet layer 22 shown in FIG. 2 but utilizing a 1000 Angstrom thin film coating of a lead-alumina-silica glass sold under the trade designation IP-820 by Innotech Corporation was fashioned by depositing the film on a 48 gauge PET substrate. The coated PET substrate had a WVTR value of 0.0414 and the samples passed the simulated retort test. In addition, this sample was tested for oxygen transmission and showed an oxygen transmission rate (OTR) of 0.168 cubic centimeters per 100 square inches per day. The oxygen transmission rate for 92 gauge PET uncoated is 3.95 in the same units. THe IP-820 coating thus reduced the OTR by about one order of magnitude. It is anticipated that oxygen transmission measurements on the film structures given in Examples 1 through 10 above would also show a substantial reduction in oxygen transmission rate over the uncoated substrates. For example, a 1000Å chromium oxide layer formed on a 48 gauge PET substrate reduced the OTR to 0.426. Furthermore, the reductions in water vapor transmission rates and oxygen transmission rates should correlate with similar reductions generally in transmission rates of other vapors and other gasses. This is based generally on the known properties of the types of materials which are utilized in the thin film layers and the known physics and chemistry of the deposition process for these substrates and thin film materials.

EXAMPLE 12

Laminated film structures corresponding to those depicted in FIG. 3 were fabricated by depositing a thin film coating on 92 gauge PET substrate, utilizing a chromium adhesion layer between about five and ten Angstroms in thickness and a barrier layer of thickness either about 1000 Angstroms or about 2000 Angstroms formed by evaporating a mixture of silicon dioxide and magnesium fluoride, using about 5 weight percent magnesium fluoride in the source. Substrates used were DuPont LB Polyester or a Type C (Capicitor Grade) polyester. The coated PET substrates were laminated to 5 mil Extrel 24 polypropylene using an appropriate laminating adhesive. Measured WVTR values were as low as 0.0130 and ranged up to about 0.0294. The laminated coated film structure passed the simulated retort test previously described. Overall transmission of light at 550 nanometers was measured on unlaminated samples and was about 85 percent.

Table 2 below gives typical WTVR values for additional laminated coated film designs. In each case except the first two the substrate is DuPont LB polyester 92 Gauge with the coated substrate bonded to 5 mil Extrel 24 Polypropylene utilizing 3M 4910 pressure sensitive adhesive. The first two designs utilized 1.5 mil oriented polypropylene sold under the trade designation Norprop. The designation "TC-36" refers to a tantalum-chrome alloy containing thirty-six percent by weight chrome. The designation "MS-65" refers to a layer of silicon dioxide mixed with a magnesium oxide glass modifier and having sixty-five percent by weight silicon dioxide.

TABLE 2

| Permeability data for Designs Involving Adhesion Layers Other Than Chromium Metal | |
|---|---|
| COATING DESIGN (Laminated) | WVTR |
| PET/10Å TC-36/2000Å SiO/10Å TC-36 | 0.0393 |
| PET/10Å TC-36/2000Å SiO | 0.0570 |
| PET/40Å Ta/2000Å MS-65 | 0.00981 |
| PET/10Å Mo/2000Å SiO | 0.0271 |
| PET/20Å Mo/2000Å SiO | 0.0245 |
| PET/40Å Mo/2000Å SiO | 0.0252 |

Table 3 gives typical WVTR values for unlaminated structures corresponding generally to the coating designs depicted in FIG. 1 or FIG. 3. All of the PET substrates are 92 gauge except the last two items which are 48 gauge and all of the coated PET samples passed the simulated retort test.

TABLE 3

| FILM STRUCTURE | RATE |
|---|---|
| DUPONT LB PET/10Å Cr/2000Å SiO | 0.201 |
| DUPONT LB PET/10Å Cr/2000Å SiO/10Å Cr | 0.154 |
| TEIJIN PET/10Å Cr/2000Å SiO | 0.0884 |
| TEIJIN PET/10Å Cr/2000Å SiO/10Å Cr | 0.145 |
| DUPONT LB PET/10Å Cr/1500Å SiO | 0.195 |
| DUPONT LB PET/10Å Cr/1500Å SiO/10Å Cr | 0.214 |
| PET/50Å CrO$_x$/1500Å SiO | 0.274 |
| PET/100Å CrO$_x$/1500Å SiO | 0.188 |
| PET/100Å CrO$_x$/2000Å SiO | 0.106 |
| PET/100Å CrO$_x$/2500Å SiO | 0.070 |
| PET/50Å Cr$_2$O$_3$/2000Å SiO | 0.371 |
| PET/100Å Cr$_2$O$_3$/2000Å SiO | 0.166 |
| PET/200Å Cr$_2$O$_3$/2000Å SiO | 0.185 |
| PET/300Å Cr$_2$O$_3$/2000Å SiO | 0.172 |
| PET/10Å Ni/2000Å SiO | 0.169 |
| PET/100Å Ni/2000Å SiO | 0.080 |

Table 4 gives relative transmission values at a wavelength of 550 nanometers for various samples of coated PET substrates using various coating design parameters corresponding to the coated substrate design 30 depicted in FIG. 3 or the coated substrate design 40 in FIG. 4, all before lamination. The barrier layers designed MS-65 consisted of thirty-five percent by weight of magnesium oxide and sixty-five percent by weight of silicon dioxide.

TABLE 4

| COATING DESIGN | TRANSMISSION (uncoated PET Standard) | OVERALL TRANSMISSION |
|---|---|---|
| 2Å Cr/2000Å SiO/2Å Cr | 74% | 56% |
| 5Å Cr/2000Å SiO/5Å Cr | 71% | 54% |
| 10Å Cr/2000Å SiO/10Å Cr | 59% | 45% |
| 20Å Cr/2000Å SiO/20Å Cr | 46% | 35% |
| 50Å Cr/2000Å SiO/50Å Cr | 14% | 11% |
| 2Å Cr/2000Å MS-65/2Å Cr | 96% | 73% |
| 5Å Cr/2000Å MS-65/5Å Cr | 83% | 63% |
| 10Å Cr/2000Å MS-65/10Å Cr | 77% | 59% |
| 20Å Cr/2000Å MS-65/20Å Cr | 50% | 38% |
| 2000Å SiO—Cr Cermet (20 Wt % Cr & $O_2$ pressure $10^{-4}$ torr) | 98% | 76% |
| 2000Å SiO—Cr Cermet (10 Wt % Cr & $O_2$ pressure $10^{-5}$ torr) | 43% | 34% |
| 2000Å SiO—Cr Cermet (10 Wt % Cr & $O_2$ pressure $10^{-4}$ torr) | 99% | 76% |

From the above description of various embodiments and examples, it should be apparent that this invention achieves an article comprising a flexible polymer substrate and a thin film coating carried on a surface of that substrate with the overall article characterized by the properties of substantial transparency in the visible portion of the electromagnetic radiation spectrum, the capability of withstanding superheated water of steam sterilization operation and substantially lower gas and vapor permeability compared to uncoated polymer substrate. While a fairly wide range of inorganic materials have been tested and a number have been discovered to provide these properties, it should be understood that further investigation by persons skilled in this art may well uncover additional materials for the composite coatings described above to achieve the same properties. Accordingly, it should be understood that numerous modifications could be made in the embodiments and examples given above without departing from the scope of this invention as claimed in the following claims.

What is claimed is:

1. An article comprising a flexible polymer substrate and a thin film coating carried on at least one surface of said substrate and characterized by substantial transparency in the visible portion of the electromagnetic readiation spectrum, the barrier properties of substantially lower gas and vapor permeability, and the capability of withstanding retorting conditions of a superheated water or steam sterilization operation by maintaining adhesion of said coating to said substrate and retaining said barrier properties, said thin film coating comprising a composite of at least two separate inorganic materials preselected from a group of materials which have been predetermined to produce all of said properties concurrently; said composite thin film coating comprising a thin film adhesion layer formed directly on said substrate of first material selected from the group consisting of chromium, tantalum, nickel, molybdenum, oxides of chromium, alloys of chromium with tantalum and nickel, a co-deposited mixture of chromium and silicon monoxide having at least about twenty percent chromium by weight, and a lead-aluminum silica glass composition to confer on said article said property of being capable of withstanding said retorting conditions; and a thin film barrier layer formed on said adhesion layer of a second material selected from the group consisting of silicon monoxide, silicon dioxide and mixtures of silicon dioxide with a glass modifier selected from the group consisting of oxides of magnesium, barium, and calcium, and fluorides of alkalai earth elements to confer on said article said property of substantially lower gas and vapor permeability.

2. An article comprising a flexible polymer substrate and a thin film coating carried on at least one surface of said substrate and being bonded to a second flexible sheet on said thin film coating side using an adhesive, said article being characterized by the properties of substantial transparency in the visible portion of the electromagnetic radiation spectrum, substantially lower gas and vapor permeability compared to uncoated polymer substrate, and the capability of withstanding retorting conditions of a superheated water or steam sterilization operation, said thin film coating comprising a composite of at least two separate materials formed on said substrate, said materials being preselected from a group of materials which have been predetermined to produce said properties.

3. The article of claim 2, wherein said composite thin film coating comprises a thin film adhesion layer formed directly on said substrate of a first material selected from a first group of materials which have been predetermined to have sufficient adhesion properties to confer on said article said property of being capable of withstanding said retorting conditions; a thin film barrier layer formed on said adhesion layer of at least a second material selected from a second group of materials which have been predetermined to confer on said article said property of substantially lowered gas and vapor permeability; and a thin film adhesion layer formed on said barrier layer of a material selected from said first group of materials.

4. The article of claim 3, wherein said thin film adhesion layer is formed from a material selected from the group consisting of chromium, tantalum, nickel, molybdenum, oxides of chromium, alloys of chromium with tantalum and nickel, a co-deposited mixture of chromium and silicon monoxide having at least about ten percent by weight of chromium, and a lead-aluminum silica glass; and said thin film barrier layer is formed from a material selected from the group consisting of silicon monoxide, silicon dioxide and mixtures of silicon dioxide with a glass modifier selected from the group consisting of magnesium oxide, barium oxide, and calcium oxide and fluorides of alkalai earth elements.

5. An article comprising a flexible polymer substrate and a thin film coating carried on at least one surface of said substrate and characterized by substantial transparency in the visible portion of the electromagnetic radiation spectrum, the barrier properties of substantially lower gas and vapor permeability; and the capability of withstanding retorting conditions of a superheated water or steam sterilization operation by maintaining adhesion of said coating to said substrate, and retaining said barrier properties, said thin film coating being formed by a process of depositing on said substrate surface at least two preselected materials in prearranged sequential deposition steps to form a thin film adhesion layer of a first material and a thin film barrier layer of a second material, said first material being selected from the group consisting of chromium, tantalum, nickel, molybdenum, oxides of chromium, alloys of chromium with tantalum and nickel, a co-deposited mixture of chromium and silicon monoxide having at least about twenty percent by weight of chromium, and a lead-alumina silica glass composition; and said second material being selected from the group consisting of silicon monoxide, silicon dioxide and mixtures of silicon dioxide with a glass modifier selected from the group consisting of magnesium oxide, barium oxide, calcium oxide, and fluorides of alkalai earth elements.

6. An article comprising a flexible polymer substrate, and a thin film coating carried on at least one surface of said substrate and comprising a thin film layer of chromium formed on said substrate surface, and a thin film layer of preselected glass material formed on said layer of chromium.

7. The article of claim 6, further comprising a second thin film layer of chromium formed on said layer of preselected glass material.

8. The article of any of claims 6 or 7, wherein said thin film layer of chromium is formed to a thickness which provides substantial transparency of said thin film coating in the visible region of the electromagnetic spectrum.

9. The article of any of claims 6 or 7, wherein said layer of chromium is formed to a thickness between about five and about fifty Angstroms.

10. The article of any of claims 6 or 7, wherein said layer of glass material is a material selected from the group consisting of silicon monoxide, silicon dioxide and mixtures of silicon dioxide with a glass modifier selected from the group consisting of magnesium oxide, barium oxide, and calcium oxide, and fluorides of alkalai earth elements.

11. The article of any of claims 6 or 7, wherein said layer of glass material is formed to a thickness which provides substantially reduced gas and vapor permeability through said article compared to uncoated substrate material.

12. The article of any of claims 6 or 7, wherein said layer of glass material is formed to a thickness in the range between about 500 Angstroms and about 4000 Angstroms.

13. The article of any of claims 6 or 7, wherein said thin film layer of chromium is formed to a thickness which provides substantial transparency of said thin film coating in the visible region of the electromagnetic spectrum, and said layer of glass material is formed to a thickness which provides substantially reduced gas and vapor permeability through said article compared to uncoated substrate material.

14. The article of any of claims 6 or 7, wherein said layer of chromium is formed to a thickness between about 5 Angstroms and about 50 Angstroms, and said layer of glass material is formed to a thickness in the range between about 500 Angstroms and about 4000 Angstroms.

15. The article of any of claims 6 or 7, wherein said layer of chromium is formed to a thickness between about 5 Angstroms and about 50 Angstroms, said layer of glass material is a material selected from the group consisting of silicon monoxide, silicon dioxide and mixtures of silicon dioxide with a glass modifier selected from the group consisting of maganesium oxide, barium oxide and calcium oxide, and fluorides of alkalai earth elements, and said layer of glass material is formed to a thickness in the range between about 500 Angstroms and about 4000 Angstroms.

* * * * *